E. J. ROHRBACHER.
AUTOMATIC HOSE COUPLING.
APPLICATION FILED SEPT. 10, 1914.

1,189,624.

Patented July 4, 1916.

WITNESSES:
A. L. Bowen.
E. Peterson.

INVENTOR
Edward J. Rohrbacher
BY
Pierre Barnes
ATTORNEY

UNITED STATES PATENT OFFICE.

EDWARD J. ROHRBACHER, OF SEATTLE, WASHINGTON, ASSIGNOR, BY DIRECT AND MESNE ASSIGNMENTS, TO ROMORT MANUFACTURING COMPANY, OF SEATTLE, WASHINGTON, A CORPORATION OF WASHINGTON.

AUTOMATIC HOSE-COUPLING.

1,189,624.     Specification of Letters Patent.     Patented July 4, 1916.

Application filed September 10, 1914. Serial No. 860,998.

*To all whom it may concern:*

Be it known that I, EDWARD J. ROHRBACHER, citizen of the United States, residing at Seattle, in the county of King and State of Washington, have invented certain new and useful Improvements in Automatic Hose-Couplings, of which the following is a specification.

This invention relates to hose couplings and has for its object the provision of an automatic coupling device for use in connection with air pumps whereby the device may be applied to an inlet valve of a pneumatic tire to make separable connection between the air pump and the interior of the tire and providing for an automatic shut-off of the air when said coupling is removed from the tire valve.

The invention consists of a novel construction, adaptation and combination of devices, as will be described in the following specification, illustrated in the accompanying drawing, and finally set forth in the appended claims.

Figure 1:
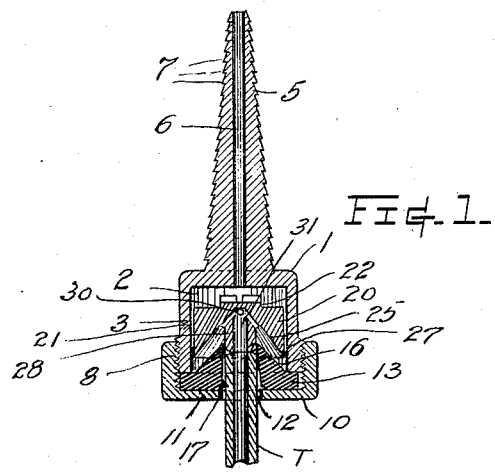
Figure 3:
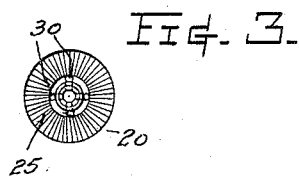
Figure 2:
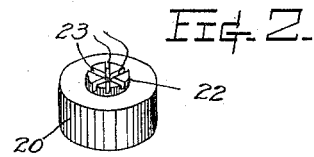
Figure 4:
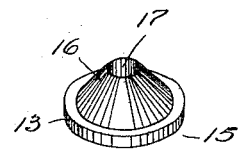

In said drawing, Figure 1 is a longitudinal sectional view of an embodiment of my invention shown with the cut-off valve member lifted by the interposition of a pneumatic tire valve to afford a passage therethrough for the compressed air. Fig. 2 is a perspective view of said valve member shown detached. Fig. 3 is an underside plan view of the same. Fig. 4 is a perspective view of a gasket employed in the invention.

Referring to said views, the reference numeral 1 designates a casing formed with a chamber 2 therein having cylindrical wall 3. A nipple 5 is formed integrally with said casing and is provided with a longitudinal bore 6 in axial alinement with the chamber. Said nipple is desirably tapered and formed externally with ridges 7 for convenient connection with a rubber hose, or the like, connected to an air pump or source of air supply under pressure, not shown. The opposite end of said casing from the nipple 5 is provided with exterior screw threads 8. A cap 10 is provided with internal screw threads to make connection with the casing to close the bottom of the same through the medium of the cap web 11. Said web is formed with a centrally positioned opening 12. The annular base 13 of a rubber gasket 15 (see Fig. 4) is interposed between the end of said casing 1 and the cap web 11, so as to make an air-tight joint therebetween. Said gasket is further formed with a frusto-conical head 16 disposed concentric with respect to its base 13 and is provided with a vertically arranged passage 17.

20 designates a valve member having a cylindrical body which is positioned within the casing for limited vertical movement therein, there being provided only sufficent space between its peripheral wall 21 and the opposing wall 3 of the chamber 2 to permit the passage of air therebetween. Extending above the upper surface of said member is a centrally positioned boss 22 formed with a plurality of radially directed grooves 23, which serve to allow the passage of air from the bore 6 into the recess 2, when the boss 22 is in contact with the casing, as will occur when the member 20 is in its uppermost position.

In the underside of the member 20 is provided a conical recess 25 whose inclined wall is of somewhat greater pitch than the opposed inclined surface of the gasket-head 16. A relatively sharp circular edge is provided at the lower extremity of said member, as at 27, to engage with the gasket 15 at about the junction of the lower edge of said head 16 with the base 13 of the latter when the valve member is in its lowermost, or closed, position. A centrally positioned and tubular pin 28 projects downwardly from the underside of said valve member into the recess 25 and, when said member is in its lowermost position, such pin extends within the passage 17. Branch openings 30 connect the chamber 25 with the bore 31 of said pin in proximity to the base of the latter.

The operation of the apparatus described may be explained as follows: Normally, when the house coupling comprising the subject-matter of this invention is unattached to a tire valve, the pressure of air from an air-pump or storage tank entering the chamber 2 forces the valve member upward and seats the same firmly upon the gasket 15, the relatively sharp edge of which forms a seat through which air will not readily escape. The pin 28 projects slightly within the passage 17 of the gasket. When a tire valve, designated by T in Fig. 1, is inserted through the opening 12 of the cap and through the lower portion of said gasket-passage, it engages the pin 28 and raises the valve member from its seat to permit the passage of compressed air through the bore 6 into chamber 2 about the valve member 20 through the chamber 25 and thence through the branch passages 30 and through the bore 31 into the tire valve. When the tire valve is removed from the coupling, the air pressure again forces the valve member against the gasket and obviates any leakage of air.

Having described my invention, what I claim, is—

1. In a hose coupling, a casing formed with a chambered recess, having cylindrical side walls and a cap secured over said casing inclosing said recess and provided with an opening axially of said casing, a gasket secured between said casing and said cap and formed with a conical head extending into said recess, said gasket having a passage through said head in alinement with said cap-opening, and a valve member arranged for limited longitudinal movement within said recess, said valve member being of smaller diameter than said recess to afford a passageway for air, and being chambered on its underside affording a circular edge engageable with said gasket, and having a tubular pin arranged centrally of said chamber adapted to enter the passage of said gasket, the tubular bore of said pin communicating with the chamber of said valve member.

2. In a hose coupling, a casing formed with a chambered recess, having cylindrical side walls and an integrally connected nipple having an axially alined bore communicating with said recess and a cap secured over said casing inclosing said recess and provided with an opening axially of said casing, a gasket secured between said casing and said cap and formed with a passage through said head in alinement with said cap-opening, and a valve member arranged for limited longitudinal movement within said recess, provided with means upon its upper side to prevent closing of said bore, said valve member being of smaller diameter than said recess to afford a passageway for air, and being chambered on its underside affording a circular edge engageable with said gasket, and having a tubular pin arranged centrally of said chamber adapted to enter the passage of said gasket, the tubular bore of said pin communicating with the chamber of said valve member.

3. In a hose coupling, a casing formed with a chambered recess having cylindrical side walls and a tubular nipple communicating therewith, a cap secured over said casing inclosing said recess and provided with an opening axially of said recess, a gasket secured between said casing and said cap having an opening in the axis of said recess, and a valve member arranged for limited longitudinal movement within said recess, said valve member being of smaller diameter than said recess to afford a passageway for air, and being chambered on its underside to provide a circular edge engageable with said gasket.

4. In a hose coupling, a casing formed with a chambered recess having cylindrical side walls and a tubular nipple communicating therewith, a cap secured over said casing inclosing said recess provided with an opening axially of said recess, a gasket secured between said casing and said cap having an opening in the axis of said recess, and a valve member arranged for limited longitudinal movement within said recess provided with means upon its upper side to prevent the closing of the passage into said nipple, said valve member being of smaller diameter than said recess to afford a passageway for air and being chambered on its underside to provide a circular edge engageable with said gasket.

5. In a hose coupling, a casing formed with a chambered recess, having cylindrical side walls and a tubular nipple communicating therewith, a cap secured over said casing inclosing said recess provided with an opening axially of said recess, a gasket secured between said casing and said cap having an opening in the axis of said recess, and a valve member arranged for limited longitudinal movement within said recess, said valve member being of smaller diameter than said recess to afford a passageway for air and being chambered on its underside to provide a circular edge engageable with said gasket, said valve member having a pin arranged centrally of the chamber provided with an axially arranged bore communicating at its inner end with said chamber.

6. A connector of the class described, which embodies a valve-case provided with an inlet nipple in one of its end portions and a removable clamping collar disposed on its other end portion, a flexible disk provided with an orifice and clamped between said clamping collar and the end surface of said other end portion of said valve-case to form a flexible end wall thereof, a disk-like valve-member which is provided in one of its sides with a centrally disposed recess and with a concentrically disposed annular recess, and a passageway for air extending between said recesses, said valve member being loosely disposed within said valve-case with its recessed side adjacent to said flexible disk to adapt it to be forcibly engaged with said flexible disk in response to the pressure of compressed air within said valve-case.

Signed at Seattle, Wash., this 25th day of August, 1914.

EDWARD J. ROHRBACHER.

Witnesses:
PIERRE BARNES,
E. PETERSON.